(12) United States Patent
Siegfriedsen

(10) Patent No.: US 11,437,770 B2
(45) Date of Patent: Sep. 6, 2022

(54) ELECTRICAL COUPLING FOR CONNECTING A WIND TURBINE TO AN ELECTRICITY NETWORK

(71) Applicant: Aerodyn Consulting Singapore PTE LTD, Singapore (SG)

(72) Inventor: Sonke Siegfriedsen, Rendsburg (DE)

(73) Assignee: Aerodyn Consulting Singapore PTE LTD, Singapore (SG)

( * ) Notice: Subject to any disclaimer, the term of this patent is extended or adjusted under 35 U.S.C. 154(b) by 301 days.

(21) Appl. No.: 16/618,705

(22) PCT Filed: Aug. 6, 2018

(86) PCT No.: PCT/IB2018/055896
§ 371 (c)(1),
(2) Date: Dec. 2, 2019

(87) PCT Pub. No.: WO2019/043479
PCT Pub. Date: Mar. 7, 2019

(65) Prior Publication Data
US 2021/0305762 A1 Sep. 30, 2021

(30) Foreign Application Priority Data
Aug. 28, 2017 (DE) ...................... 10 2017 119 635.8

(51) Int. Cl.
*H01R 39/02* (2006.01)
*F03D 80/80* (2016.01)
*H01R 13/52* (2006.01)

(52) U.S. Cl.
CPC .............. *H01R 39/02* (2013.01); *F03D 80/85* (2016.05); *H01R 13/521* (2013.01); *F05B 2240/57* (2013.01)

(58) Field of Classification Search
CPC ....... H01R 39/02; H01R 13/521; F03D 80/85; F05B 2240/57
See application file for complete search history.

(56) References Cited

U.S. PATENT DOCUMENTS 8,585,413 B2  11/2013  Koplow
9,702,347 B2   7/2017  Madson
(Continued)

FOREIGN PATENT DOCUMENTS

CN  102192105  9/2011
CN  102597492  7/2012
(Continued)

*Primary Examiner* — Sean Gugger
(74) *Attorney, Agent, or Firm* — Diederiks & Whitelaw, PLC.

(57) ABSTRACT

Coupling for connecting a wind turbine to a power grid, the coupling comprising a first support having at least one first electrical connector and a second support having at least one second electrical connector that is complementary to the first electrical connector, the first support and the second support being rotatable with respect to one another, characterized in that at least one of the connectors is movable transversely to the plane of the supports relative to the other connector in order to form and disconnect an electrical plug connection and the connectors are sealed against the penetration of moisture both when they are interconnected and when they are separated.

13 Claims, 6 Drawing Sheets

(56) References Cited

U.S. PATENT DOCUMENTS

| | | | |
|---|---|---|---|
| 10,308,328 B2 | 6/2019 | Siegfriedsen | |
| 2011/0181127 A1* | 7/2011 | Safabakhsh | F03D 80/85 |
| | | | 307/145 |
| 2011/0241347 A1* | 10/2011 | Bou | B63B 35/44 |
| | | | 405/195.1 |
| 2012/0202369 A1* | 8/2012 | Blaxland | F03B 17/061 |
| | | | 439/271 |
| 2018/0287369 A1* | 10/2018 | Letas | H02P 9/107 |
| 2019/0323486 A1 | 10/2019 | Siegfriedsen | |

FOREIGN PATENT DOCUMENTS

| | | |
|---|---|---|
| CN | 106194608 | 12/2016 |
| DE | 10 2010 045 920 | 3/2012 |
| GB | 2167612 | 5/1986 |
| GB | 2526567 | 12/2015 |
| JP | 2009240021 | 10/2009 |
| KR | 101368777 | 3/2014 |
| TW | 201434220 | 9/2014 |
| WO | 2011065840 | 6/2011 |
| WO | 2014053230 | 4/2014 |

\* cited by examiner

ELECTRICAL COUPLING FOR CONNECTING A WIND TURBINE TO AN ELECTRICITY NETWORK

CROSS-REFERENCE TO RELATED APPLICATIONS

This application represents the U.S. National Phase of International Application number PCT/IB2018/055896 entitled "Electrical Coupling for Connecting a Wind Turbine to an Electricity Network" filed 6 Aug. 2018, which claims priority to German Appl. Serial. No. 10 2017 119 635.8 filed 28 Aug. 2017, all of which are incorporated herein by reference.

BACKGROUND OF THE INVENTION

The invention relates to an electrical coupling for connecting a wind turbine to a power grid. In particular, the invention relates to a coupling for connecting a wind turbine to a power grid that comprises a first support having at least one first electrical connector and a second support having at least one second electrical connector that is complementary to the first electrical connector, the first support and the second support being rotatable with respect to one another.

Specifically, the invention relates to a floating wind turbine that is rotatable about an anchor point that is substantially rotationally fixed.

A coupling known from KR 10-1368777 B1, which is arranged in the tower of an onshore wind turbine, consists of two supports that are arranged on top of one another, are designed as disks, are rotatable with respect to one another and each comprise a plurality of connectors that are rigidly connected to the disks. The connectors of one disk form a plug connection together with the connectors of the other disk, which plug connection connects the turbine components arranged in the nacelle to the turbine components arranged in the base of the wind turbine.

When the nacelle of the wind turbine rotates, the electrical conductors that connect the electrical components arranged in the nacelle to the connectors arranged in the upper disk are twisted, such that it is occasionally necessary to untwist the electrical conductors so that they are not damaged or even broken.

For this purpose, the disks and therefore the connectors are separated due to the disks moving away from one another, the upper disk is rotated into a position in which the electrical conductor is untwisted and the connectors of the upper and lower disks face one another in the untwisted starting position and the disks are joined back to the connectors in order to form an electrical plug connection.

A disadvantage of the known coupling device is that it can be operated only in the low-voltage range, as removing the supports formed as disks in applications in the medium-voltage or high-voltage range without further adaptations can lead to damage to the turbine due to overload or short-circuiting.

Another disadvantage of the known coupling is that in climate regions with high humidity, in particular when using offshore wind turbines, the coupling is protected merely insufficiently against the penetration of moisture. In this case, it is particularly obstructive that the supports of the connectors formed as disks have to be separated from one another so that sealing the disks that move against one another is not only complex, but in fact it is likely that removing one disk from the other disk in the case of complete sealing is prevented by the vacuum produced in this process and the penetration of moisture through the seal is even promoted.

SUMMARY OF THE INVENTION

It is therefore the object of the invention to create a coupling that is effectively protected from the penetration of moisture and in particular can also be used in the medium-voltage and high-voltage range.

The basic concept of the invention is to arrange the supports bearing the connectors such that in order to form and disconnect the plug connection, the supports do not have to be moved relative to one another, but rather only at least one of the connectors has to be moved relative to the other connector. This design permits (common) sealing of the connectors against moisture and avoids the disadvantages known from the prior art.

According to the invention, an electrical coupling for connecting a wind turbine to a power grid is therefore provided, comprising a first support having at least one first electrical connector, a second support having at least one second electrical connector that is complementary to the first connector, the first support and the second support being rotatable relative to one another, at least one of the connectors being movable relative to the other connector in order to form and disconnect an electrical plug connection, and the connectors being sealed against the penetration of moisture both when interconnected and when separated.

In the simplest case, the supports may be designed as frames that can be twisted relative to one another and on which the connectors are arranged.

Preferably, however, the supports are each designed as a disk into which the connectors are inserted. In particular, the supports are designed as identical disks that are arranged congruently one above the other.

Alternatively, the diameter of one disk is particularly preferably larger than the diameter of the other disk, the larger disk forming a skirt that encloses the smaller disk at least in part. Specifically, a seal that seals the two supports against one another is provided in this side region, the arrangement on the side having the advantage that the upper disk does not exert a gravitational force on the seal and wear to the seal is therefore relatively low.

One of the supports is rotatable, the swivel pin of the rotatable support also being in the center of the disks when the supports are designed as disks.

Preferably, a rotary drive is arranged in the swivel pin, one part of which drive is connected to one support and the other part of which drive is connected to the other support.

Alternatively, one support is formed as a ring that surrounds the other support, the at least one connector being radially movable in the plane of the supports in this case.

According to another preferred embodiment, a seal that protects the gap between the supports against the penetration of moisture is provided.

If in particular a plurality of connectors is arranged in each case on the first support and second support, these connectors are protected against the penetration of moisture by a common seal that surrounds the plurality of connectors.

The plug connection is specifically designed such that the first connector can be released from the second connector only against the force of a spring. The spring is therefore supported on the first support, the force of which spring acts on the first connector towards the second connector, and the coupling therefore always strives for a state in which the connectors are interconnected.

In order to be able to ensure precise positioning of the connectors relative to one another, a sensor that detects the rotational position of the supports relative to one another is also provided. This sensor is preferably designed as an absolute encoder.

Correspondingly, a wind turbine is also claimed, the wind turbine being a floating wind turbine that is rotatable about an anchor point that is anchored in a substantially rotationally fixed manner and the first connector being rigidly connected to an electrical conductor that is connected to the power-generating electrical components of the wind turbine and the second connector being connected to a submarine cable for rotation therewith.

In this embodiment, therefore, components of a wind turbine do not cause electrical conductors to twist, but rather it is the floating wind turbine, which is rotatably anchored to an anchor point, that does so.

Preferably, the wind turbine comprises a heavy-duty circuit breaker on the grid side that is electrically connected to the second connector. The heavy-duty circuit breaker may alternatively be arranged in a transformer station and therefore not be a component of the wind turbine. In any case, however, an arrangement is to be provided in which the second connector is electrically connected on the grid side to a heavy-duty circuit breaker, in order to de-energize the turbine and in particular the electrical coupling. In this case, the wind turbine must be equipped with an individual energy store (and an individual control means, of course), so that the rotary drive can untwist the electrical conductor in an automated manner.

The anchor point is specifically designed as a mooring buoy that is anchored in a rotationally fixed manner.

If a mooring buoy is used for mechanically fastening the floating wind turbine, the coupling is preferably arranged in turn in the mooring buoy. However, the coupling may also be arranged outside of the mooring buoy, for example in the fundament or a float that gives the fundament buoyancy.

In any case, the supports are particularly preferably horizontal and are rotatable with respect to one another about a substantially vertical axis.

Finally, another sensor that detects the rotational position of the wind turbine relative to the coupling is provided, which sensor releases the plug connection by means of a control means, correspondingly to be provided, when a predetermined angle of rotation or a predetermined number of rotations are exceeded.

In this case, a central control means is also provided that controls not only releasing the plug connection, but also shutting down the wind turbine, actuating the heavy-duty circuit breaker, communicating to the control center of a wind farm, twisting one support as far as the starting position, producing the electrical connection, actuating the heavy-duty circuit and restarting the turbine. This central control means may also be integrated in the main control means of the turbine, it being advantageous to provide an individual backup battery.

The invention is in particular suitable for the floating wind turbine developed by the applicant, which has become known in connection with the documents WO 2016/000681 A1 and DE 10 2016 111 332 B3, for example.

BRIEF DESCRIPTION OF THE DRAWINGS

The invention is explained in greater detail in the following with reference to a particularly preferable embodiment shown in the accompanying drawings, in which.

DETAILED DESCRIPTION OF THE INVENTION

Figure 1:
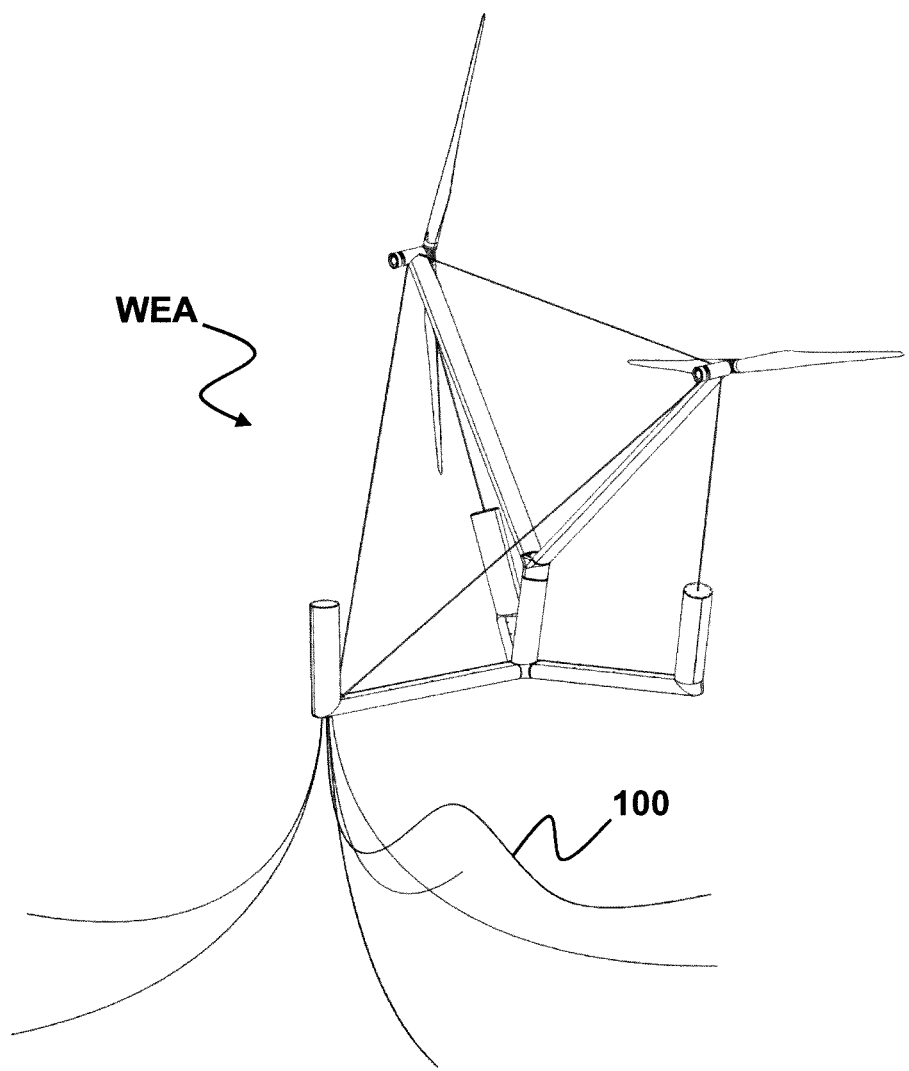
FIG. 1 is a perspective view of a particularly preferably designed floating wind turbine comprising a coupling designed according to the invention.

FIG. 1 is a perspective view of a particularly preferably designed floating wind turbine that is connected to an anchor point so as to be rotatable thereabout and in which the coupling designed according to the invention can be advantageously used.

In particular, FIG. 1 shows a floating wind turbine WEA, which is connected to a power grid by means of a submarine cable 100.

Figure 2:
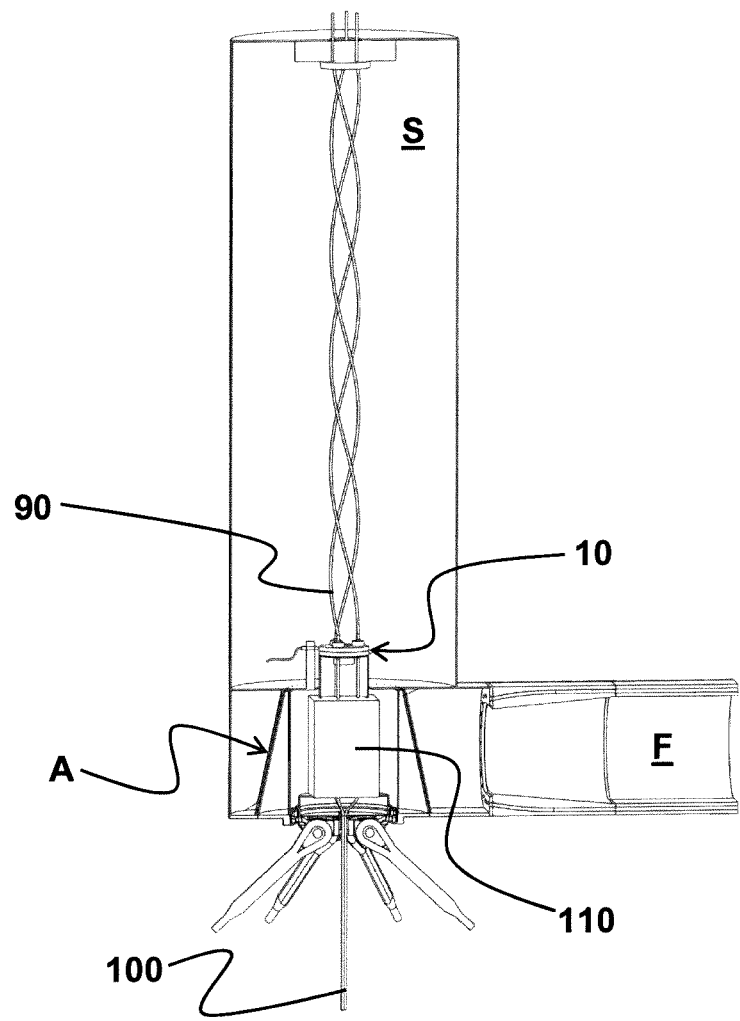
FIG. 2 is a cut side view of a particularly preferably designed floating wind turbine comprising a particularly preferred embodiment of a coupling according to the invention.

In this case, FIG. 2 is a cut side view of the wind turbine WEA shown in FIG. 1 comprising a particularly preferable embodiment of a coupling 10 according to the invention.

The detail of the floating wind turbine WEA shown in FIG. 2 shows a cross section through a float S that is connected to the fundament F and in the region of which a coupling is provided for connection to the anchor point A. The anchor point A is in particular designed as a mooring buoy, the wind turbine A being able to rotate about the anchor point. For this purpose, the mooring buoy comprises a base plate that is rigidly connected to the bottom of the body of water and is mounted in an inner bearing ring such that the wind turbine WEA that is rigidly connected to the wall of the mooring buoy can rotate about the base plate. The anchor point A is therefore anchored in a rotationally fixed manner with regard to the bottom of the body of water and is connected to a submarine cable 100, by means of which the wind turbine WEA is connected to a power grid.

Particularly preferably, a heavy-duty circuit breaker 110 that connects the wind turbine WEA to the power grid is arranged inside the mooring buoy, on which circuit breaker the electrical coupling 10 according to the invention is arranged in a rotationally fixed manner, which electrical coupling connects the submarine cable 100 to a plurality of electrical conductors 90 (indirectly) via the coupling 10, which plurality of electrical conductors lead to the power-generating electrical components of the wind turbine WEA (not shown).

When the wind turbine WEA rotates about the substantially rotationally fixed anchor point A, the electrical conductors 90 (as shown) twist around one another and have to be untwisted after a predetermined threshold value is reached, as explained in the following.

Figure 3:
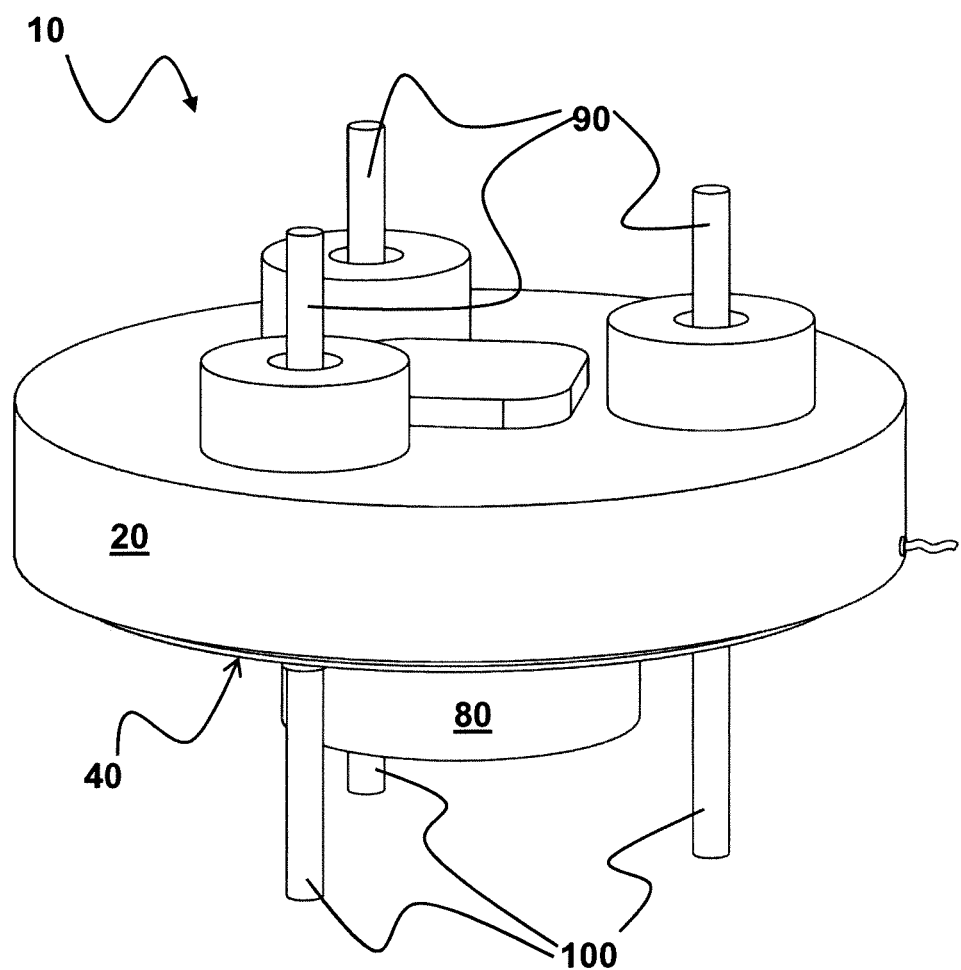
FIG. 3 is a perspective view of the particularly preferably designed coupling from FIG. 2.

An electrical coupling 10 of this kind is shown in detail in a perspective view in FIG. 3.

The electrical coupling 10 comprises an upper first support 20 and a lower second support 40 that are rotatable with respect to one another by means of the rotary drive 80. In particular, the lower second support 40 that is connected to the conductors of the submarine cable 100 is connected to the anchor point A for rotation therewith. The upper first support 20, which is connected to the electrical conductors 90 that lead to the power-generating electrical components of the wind turbine WEA, is rotatable about the first support 40 by means of the rotary drive 80 in order to untwist the electrical conductors 90.

Figure 4:
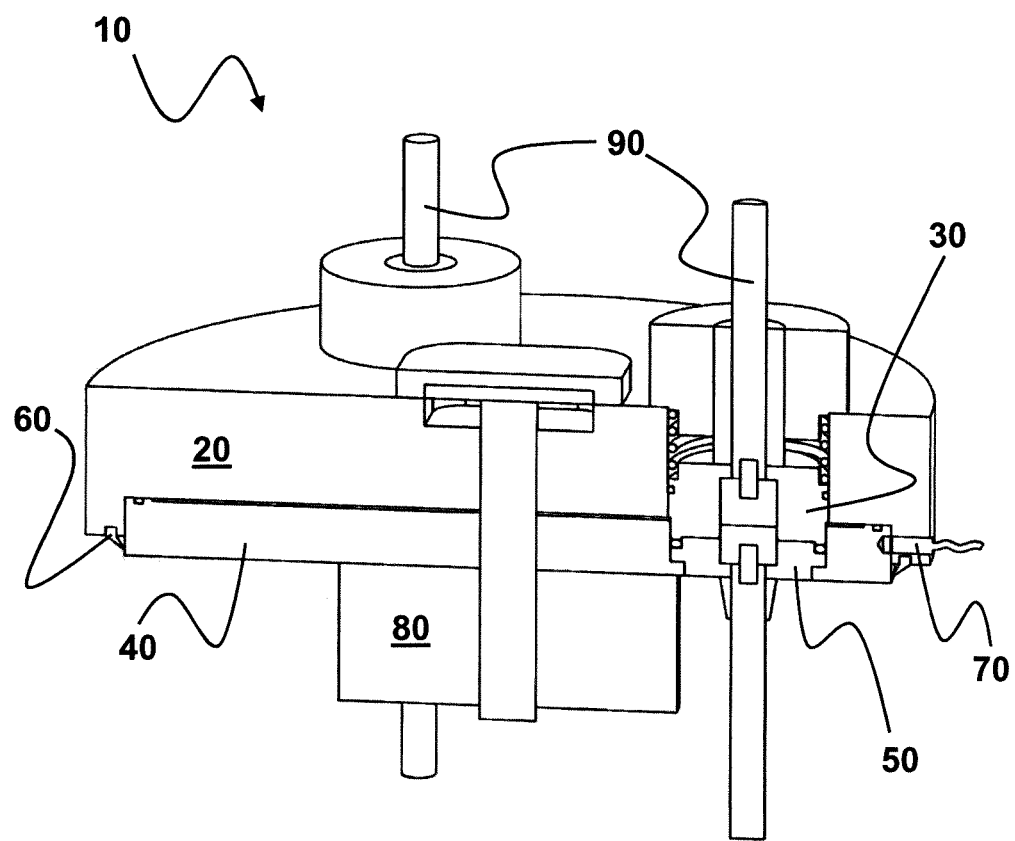
FIG. 4 is a cut side view of the preferably designed coupling comprising interconnected connectors.

Correspondingly, the connectors 30, 50 arranged on the upper first support 20 and the lower second support 40 are, as shown in FIG. 4, interconnected when the wind turbine WEA is in the power-generating operating state.

The plurality of shown connectors 30, 50 are all sealed by means of a seal 60 that seals the upper first support 20 relative to the lower second support 40. In this case, the seal 60 is fastened to a skirt that is formed on the first support 20, extends towards the second support 40 and comprises said second support, and is supported laterally on the edge of the second support 40.

The rotary drive 80 is in particular designed such that a part thereof, in which a shaft that is rigidly connected to the upper first support 20 is rotatably mounted, is connected to the lower second support 40. Owing to the axis being driven by the part of the rotary drive that is connected to the lower second support 40, the upper first support 20 can be twisted relative to the lower second support 40. The absolute position of the supports 20, 40 with respect to one another is detected by the position sensor 70. For this purpose, it is in particular provided that the sensor is rigidly connected to the upper first support 20 and is oriented radially to the lower second support 40, and the lower second support 40 bears a marking that indicates the rotational position of the first support 20 relative to the second support 40 and can be detected by the position sensor 70. The marking is, for example, a coding that permits absolute value detection of the rotational position of the supports 20, 40 with respect to one another and that allows a controlled approach to the target position.

Alternatively, a sensor that is installed in a fixed manner on the wind turbine WEA may be provided, which sensor detects a marking/coding arranged on the rotatable support 20, detects the rotational position of the coupling 10 with respect to the wind turbine WEA during rotation about the anchor point A, and permits a controlled approach when the cable 90 is untwisted.

If the wind turbine WEA then rotates about the electrical coupling 10 rigidly connected to the anchor point A, so that the conductors 90 that are rigidly connected to the upper first support 20 are twisted together, it is necessary to untwist the conductors 90. The rotational position of the wind turbine WEA in relation to the coupling 10 is monitored in this case by an additional sensor (not shown) that monitors the relative rotational position of the wind turbine WEA with respect to the coupling 10. This sensor corresponds to the above-mentioned alternatives for the shown sensor 70, so that said sensor can optionally be completely dispensed with.

In order to untwist the conductors 90 connected to the upper first support 20, the turbine is initially removed from the power grid in a first step by actuating a heavy-duty circuit breaker 110 arranged on the grid side. The heavy-duty circuit breaker 110 is arranged in particular in the mooring buoy.

Figure 5:
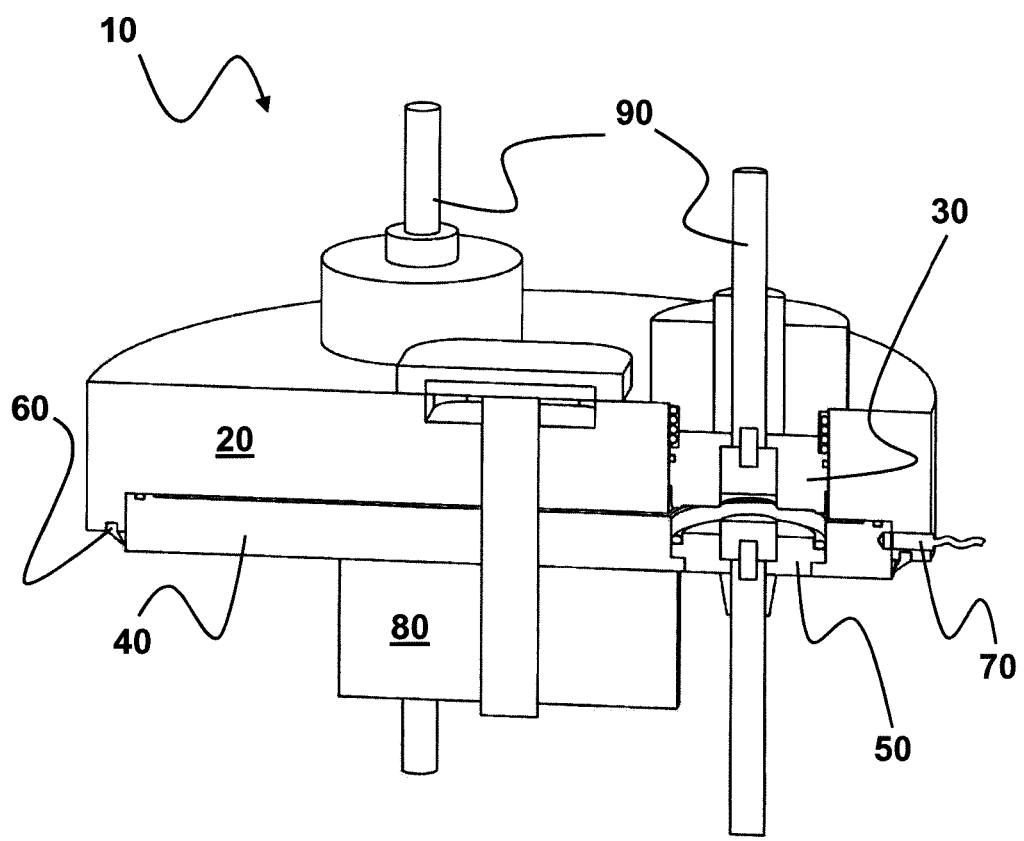
FIG. 5 is a cut side view of the preferably designed coupling comprising separated connectors.

In a second step, the connectors 30, 50 are separated. In the example shown in FIG. 5, this takes place by moving the connector 30 arranged in the upper first support 20 transversely to the plane of the supports 20, 40. For this purpose, a pneumatic, electrical or electromagnetic lifting mechanism may be provided. The lifting mechanism is in particular individually formed for each plug, the individual mechanisms being actuated by a common control means so as to be coordinated. In order to carry out this step, an individual energy supply in the wind turbine WEA is required.

Figure 6:
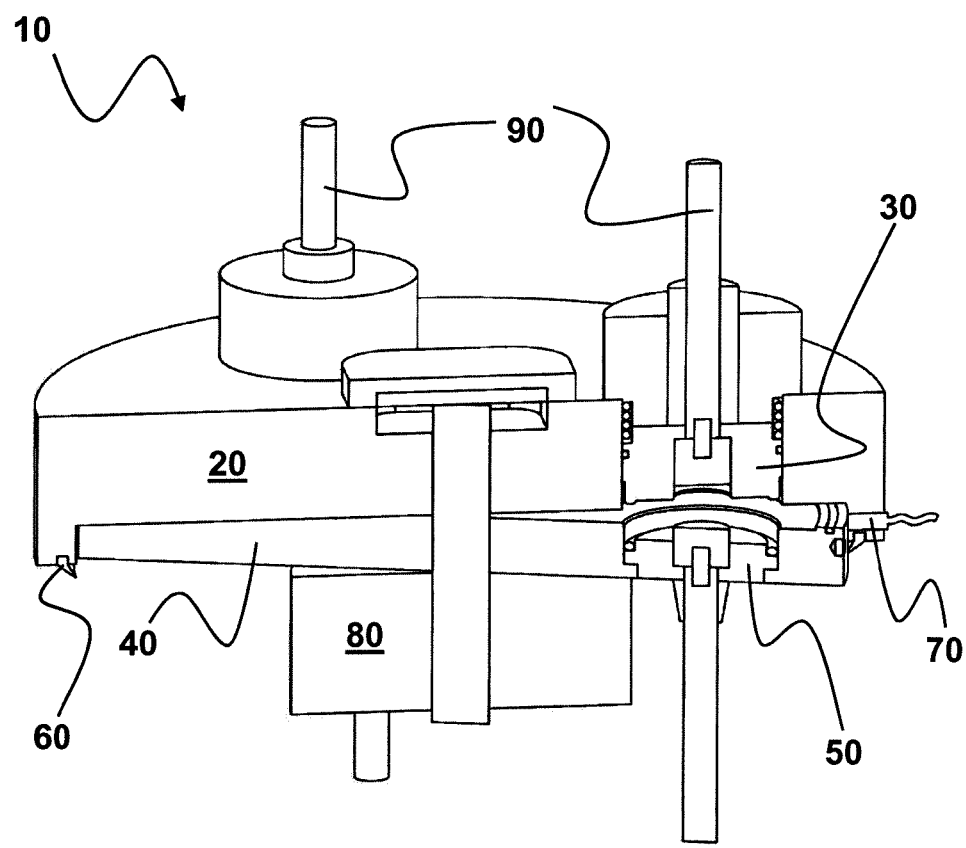
FIG. 6 is a cut side view of the preferably designed coupling comprising separated connectors and supports that are twisted relative to one another.

If the connectors 30, 50 are separated, the upper first support 20 can be rotated relative to the lower support 40 by means of the rotary drive 80 and therefore the conductor 90 that was twisted by the wind turbine WEA being rotated about the anchor point A is untwisted again. FIG. 6 is a cut side view of the preferably designed coupling comprising separated connectors and supports 20, 40 that are twisted relative to one another.

After the electrical conductors 90 have been untwisted at least in part, although preferably completely, a rotational position is approached by means of the rotary drive 80 and the sensor 70, in which rotational position the connectors 30, 50 are realigned and can be interconnected.

The lifting mechanism of the connectors is in particular provided with limit switch in each case. The limit switch can check whether the connectors 30 have each assumed a position in which the connectors 30, 50 are separated, so that the supports 20, 40 can be rotated relative to one another, or whether the connectors 30, 50 are interconnected and the wind turbine can be reconnected to the power grid by means of the heavy-duty circuit breaker. In this case, the control means of the wind turbine is designed such that the heavy-duty circuit breaker cannot be actuated after the conductors 90 have been untwisted, if not all of the connectors 30, 50 are interconnected once more.

After plug connection has taken place, the wind turbine WEA can be connected to the grid again.

The invention claimed is:

1. An electrical coupling for connecting a wind turbine to a power grid, the coupling comprising
   a first support having at least one first electrical connector, and
   a second support having at least one second electrical connector that is complementary to the at least one first electrical connector,
the first support and the second support being rotatable with respect to one another,
wherein at least one of the connectors is movable, relative to the other connector, in order to form, an electrical plug connection interconnecting the connectors and preventing rotational movement between the first and second supports, and to disconnect the electrical plug connection, thus separating the connectors and allowing relative rotation between the first support and the second support and
   the connectors are sealed against the penetration of moisture both when the connectors are interconnected and when the connectors are separated.

2. The electrical coupling according to claim 1, wherein the at least one first connector is axially movable transversely to the plane of the supports.

3. The electrical coupling according to claim 1, wherein the at least one first connector is radially movable in the plane of the supports.

4. The electrical coupling according to claim 1, wherein the supports are each designed as a disk.

5. The electrical coupling according to claim 1 further comprising a seal protecting a space between the supports against penetration of moisture.

6. The electrical coupling according to claim 1, wherein the at least one first electrical connector and the at least one second electrical connector are included in a plurality of connectors and are arranged on the first support and the second support, respectively, said coupling including a common seal that surrounds and protects the plurality of connectors from moisture.

7. The electrical coupling according to claim 1, further comprising a spring that exerts force on the first connector in the direction of the second connector.

8. The electrical coupling according to claim 1, further comprising a sensor that detects the relative rotational position of the supports with respect to one another.

9. The electrical coupling according to claim 1, further comprising a rotary drive that twists the supports relative to one another.

10. A wind turbine, characterized by a coupling according to claim 1, the wind turbine being a floating wind turbine that is rotatable about an anchored anchor point that is anchored in a substantially rotationally fixed manner and the first connector being rigidly connected to an electrical conductor that is connected to power-generating electrical components of the wind turbine and the second connector being connected to a submarine cable for rotation therewith.

11. The wind turbine according to claim 10, further comprising a heavy-duty circuit breaker that is connected to the second connector on the grid side.

12. The wind turbine according to claim 10, wherein the supports are substantially horizontal and are rotatable with respect to one another about a substantially vertical axis.

13. The wind turbine according to claim 10, further comprising a sensor that detects the rotational position of the wind turbine relative to the coupling.

* * * * *